(12) United States Patent
Leten et al.

(10) Patent No.: US 11,815,452 B2
(45) Date of Patent: Nov. 14, 2023

(54) GAS SENSOR DEVICE AND METHOD OF MANUFACTURING THE SAME

(71) Applicant: Melexis Technologies NV, Tessenderlo (BE)

(72) Inventors: Wouter Leten, Mol (BE); Joris Roels, Ghent (BE); Xiaoning Jia, Ghent (BE); Roeland Baets, Deinze (BE); Gunther Roelkens, Schellebelle (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 536 days.

(21) Appl. No.: 17/064,716

(22) Filed: Oct. 7, 2020

(65) Prior Publication Data

US 2021/0109017 A1 Apr. 15, 2021

(30) Foreign Application Priority Data

Oct. 11, 2019 (EP) .................................... 19202863

(51) Int. Cl.
*G01N 21/3504* (2014.01)
*G01N 21/31* (2006.01)
(Continued)

(52) U.S. Cl.
CPC ....... *G01N 21/3504* (2013.01); *G01N 21/314* (2013.01); *G01N 2021/0112* (2013.01);
(Continued)

(58) Field of Classification Search
CPC ............. G01N 21/3504; G01N 21/314; G01N 2021/0112; G01N 2021/052; G01N 2021/1751; G01N 2021/3166
See application file for complete search history.

(56) References Cited

U.S. PATENT DOCUMENTS 5,693,945 A 12/1997 Akiyama et al.
6,469,303 B1 10/2002 Sun et al.
(Continued)

FOREIGN PATENT DOCUMENTS

EP 2133684 A1 12/2009

OTHER PUBLICATIONS

European Search Report for European Application No. 19202863 dated Apr. 15, 2020.

*Primary Examiner* — David P Porta
*Assistant Examiner* — Carolyn Fin
(74) *Attorney, Agent, or Firm* — Harness, Dickey & Pierce, P.L.C.

(57) ABSTRACT

A gas sensor device (100) is configured to measure a predetermined gas of interest and comprises an enclosure (101) comprising a semiconductor substrate (102) and defining a first cavity (124), an optically transmissive second closed cavity (126) and a third cavity (128). The second cavity (126) is interposed between the first and third cavities (124, 128). The first cavity (124) comprises an inlet port (130) for receiving a gas under test, an outlet port (132) for venting the gas under test. The first cavity (124) also comprises an optical source (112) and a measurement sensor (114). The second cavity (126) is configured as a gaseous filter comprising a volume of the gas of interest sealingly disposed in the second cavity (126), and the third cavity (128) comprises a reference measurement sensor (116) disposed therein.

17 Claims, 3 Drawing Sheets

(51) Int. Cl.
*G01N 21/05* (2006.01)
*G01N 21/17* (2006.01)
*G01N 21/01* (2006.01)

(52) U.S. Cl.
CPC .................. *G01N 2021/052* (2013.01); *G01N 2021/1751* (2013.01); *G01N 2021/3166* (2013.01)

(56) References Cited

U.S. PATENT DOCUMENTS 8,003,945 B1 8/2011 Wong
2016/0349205 A1* 12/2016 Stetter .................. H04B 5/0062

* cited by examiner

GAS SENSOR DEVICE AND METHOD OF MANUFACTURING THE SAME

FIELD

The present invention relates to a gas sensor device of the type that, for example, comprises an optical source, measurement sensor and a reference sensor configured to measure absorption by a gas under test of electromagnetic radiation emitted by the optical source. The present invention also relates to a method of manufacturing a gas sensor device, the method being of the type that, for example, provides an optical source, a measurement sensor and a reference sensor, in a manner that enables a measurement of absorption by a gas under test of electromagnetic radiation emitted by the optical source.

BACKGROUND

In the field of gas sensors, in particular so-called nondispersive infrared (NDIR) gas sensors, it is known to provide a chamber comprising an inlet for receiving a target gas to be analysed and an outlet for venting the gas to be analysed, the chamber serving as a light path for light to be absorbed by the target gas. A source of light is provided at one end of the chamber and a pair of electromagnetic radiation detectors at the opposite end of the chamber, thereby providing a signal "arm" and a reference arm. In relation to carbon dioxide, for example, the amount of infrared electromagnetic radiation absorbed by the gas in the chamber is proportional to the concentration of the gas. Consequently, as the concentration increases, the signal output by the detector of the signal arm diminishes. The reference arm is used to compensate for drift of the optical source over time and/or temperature and should provide an output when in use that does not change when the concentration of the gas in the chamber changes. This can be achieved by placing an optical bandpass filter in front of the reference detector, which only allows wavelengths of electromagnetic radiation that are not absorbed by the target gas to pass through to the reference detector. The signal arm can be realised by providing a bandpass filter in front of the absorption detector to allow only wavelengths of electromagnetic radiation that are absorbed by the target gas to pass through to the absorption detector. The actual signal measured is a differential signal between the signal arm and the reference arm.

A typical approach to creating the optical bandpass filters is to use interference filters, which typically consist of multiple thin layers of dielectric material of very well controlled thickness and differing refractive indices. However, creating multiple thin layers of dielectric material of well controlled thickness is a cumbersome and expensive process. Also, the performance of such filters varies with the angle of incidence of received electromagnetic radiation, which means that system performance is severely degraded when optical sources with a broad angular spectrum are employed.

Another kind of gas sensor is a so-called Gas Filter Correlation (GFC) spectrometer, which instead of filters formed of multiple thin layers of dielectric material, employs a rotating filter wheel comprising two or more gas chambers, one filled with an inert gas and the others filled with the target gas or target gases. The filter wheel is placed in an optical path between a light source and a sample chamber. A measurement detector is provided in the optical path such that the sample chamber is disposed between the filter wheel and the measurement detector. GFC spectrometers are costly to produce and, like the NDIR sensor described above, relatively large.

SUMMARY

According to a first aspect of the present invention, there is provided a gas sensor device configured to measure a predetermined gas of interest, the device comprising: an enclosure comprising a semiconductor substrate and defining a first cavity an optically transmissive second closed cavity and a third cavity, the second cavity being interposed between the first and third cavities; wherein the first cavity comprises an inlet port for receiving a gas under test, an outlet port for venting the gas under test, an optical source and a measurement sensor; the second cavity is configured as a gaseous filter comprising a volume of the gas of interest sealingly disposed in the second cavity; and the third cavity comprises a reference measurement sensor disposed therein.

The reference measurement sensor may be sealingly disposed within the third cavity.

The second cavity may comprise optically transmissive apertures bordering the first and third cavities.

The first cavity may be substantially cylindrical.

The second cavity may be disposed adjacent the first cavity.

The third cavity may be disposed adjacent the second cavity and outside the first cavity.

The enclosure may further comprise a cap configured to cooperate with the substrate to define the first, second and third cavities.

The device may further comprise: walls extending away from the cap; wherein the walls may cooperate with the substrate to define the first, second and third cavities.

The walls may be integrally formed with the cap.

The device may further comprise: walls extending away from the substrate; wherein the walls may cooperate with the cap to define the first, second and third cavities.

The enclosure may comprise reflective internal surfaces.

The substrate may be reflective.

The substrate may comprise a first trench and a second trench in respect of the first cavity; the optical source may be disposed in the first trench and the measurement sensor may be disposed in the second trench.

The third cavity may comprise a getter.

According to a second aspect of the invention, there is provided a method of manufacturing a gas sensor device, the method comprising: providing a substrate comprising a first area, a second area and a third area; providing a cap; providing an optical source and a measurement sensor within the first area of the substrate; providing a reference sensor within the third area of the substrate; configuring the cap; and affixing the cap to the substrate, the substrate and cap cooperating to define a first cavity bounding the first area, a second cavity bounding the second area and a third cavity bounding the third area; and providing a volume of a gas of interest in the second cavity; wherein the cap cooperates with the substrate so that the first cavity comprises an inlet for receiving a gas under test and an outlet port for venting the gas under test.

The cap may comprise internal walls; and the method may further comprise: affixing shields respectively to exposed ends of the internal walls; orienting the cap at a non-perpendicular angle relative to a longitudinal axis; rotating the cap about the longitudinal axis; and applying a layer of the reflective material in a direction that is parallel with the longitudinal axis, the shields substantially preventing application of the reflective material to the internal walls.

The method may further comprise: affixing the cap to the substrate in an atmosphere of the gas of interest.

It is thus possible to provide a gas sensor device and a method of manufacturing a gas sensor device that provides consistent measurement results over time despite variations from sources of noise and/or long term drift, for example caused by fluctuations in intensity of the optical source or aging of the optical source or sometimes temperature. The device also does not suffer from dependence upon the angle of incidence of light upon the optical filter. The device and method provide an extremely compact sensor device that lends itself well to fabrication using semiconductor processing techniques, or other techniques that allow for low-cost mass manufacture.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
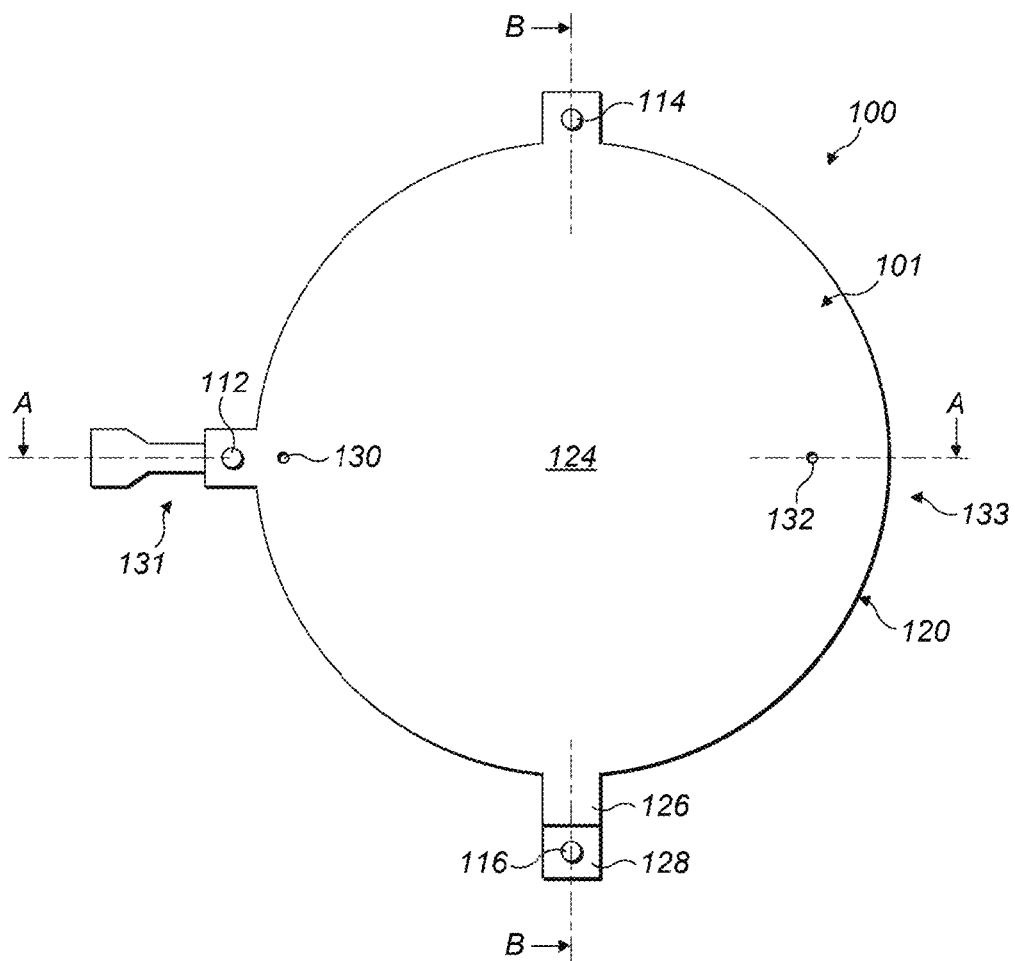
FIG. 1 is a plan view of a gas sensor device constituting an embodiment of the invention.

Throughout the following description, identical reference numerals will be used to identify like parts.

Figure 2:
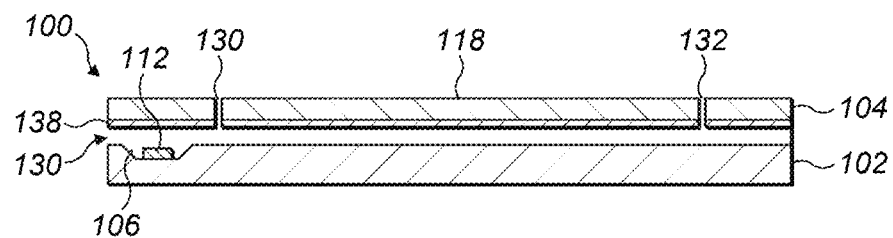
FIG. 2 is a cross-sectional view of the gas sensor device of FIG. 1 along the line A-A.
Figure 3:
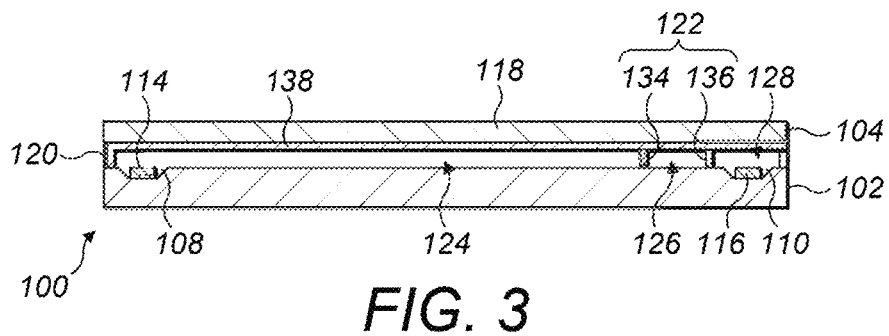
FIG. 3 is a cross-sectional view of the gas sensor device of FIG. 1 along the line B-B.

Referring to FIGS. 1, 2 and 3, a gas sensor device 100 comprises a substrate layer 102 and a cap 104. The substrate layer 102 is attached to the cap 104 to form an enclosure 101 using any suitable method, for example eutectic bonding, glass frit bonding, thermocompression bonding, or bonding using any other suitable adhesive, such as benzocyclobutene (BCB). In this example, the substrate layer 102 optionally comprises a first recess 106, which can be a trench formed in a first area of the substrate layer 102, a second recess 108, which can be a trench formed in a second area of the substrate layer 102, and a third recess 110, which can also be a trench formed in a third area of the substrate layer 102.

A light source 112 is disposed in the first recess 106 and a measurement detector 114 is disposed in the second recess 108. The light source 112 is configured, in this example, to emit electromagnetic radiation of a wavelength that is detectable by the measurement detector 114, for example light in the mid-infrared (MIR) range of the electromagnetic spectrum. In this example, the light source 112 is an MIR Light Emitting Diode (LED). However, the skilled person should appreciate that other sources of infrared electromagnetic radiation can be employed, for example a thermal heater. The measurement detector 114 is, in this example, a photodetector. However, the skilled person should appreciate that other kinds of detector can be employed, for example a thermopile or a bolometer. A reference detector 116 is of the same type as the measurement detector 114 and is disposed in the third recess 110. In this example, circuits (not shown) to drive the light source 112, the measurement detector 114 and the reference detector 116 are integrated onto the substrate layer 102.

The cap 104 comprises a cap layer 118 providing an external peripheral wall 120 extending substantially perpendicularly away from the cap layer 118 as well as internal walls 122 that also extend substantially perpendicularly away from the cap layer 118. In this example, the walls 120, 122 are integrally formed with the cap layer 118. Alternatively, the external peripheral wall 120 and the internal walls 122 can be provided on the substrate layer 102. In this example, the cap 104 is attached to the substrate layer 102 and the external peripheral wall 120 and the internal walls 122 cooperate with the substrate layer 102 so as to define a first cavity 124, a second cavity 126 and a third cavity 128. However, in the event that the substrate layer 102 is provided with the walls 120, 122, the walls 120, 122 cooperate with the cap layer 118 to define the first cavity 124, the second cavity 126 and the third cavity 128. The first area of the substrate layer 102 mentioned above is bounded by the first cavity 124, the second area of the substrate layer 102 is bounded by the second cavity 126 and the third area of the substrate layer 102 is bounded by the third cavity 128.

The first cavity 124 is, in this example, substantially cylindrical in shape and comprises an inlet port 130 for receiving a gas of interest to be tested and an outlet port 132 for venting the gas to be tested. In this example, the inlet port 130 and the outlet port 132 are disposed in the cap layer 118, although in other examples the inlet port 130 and the outlet port 132 can be disposed at other locations, with respect to, for example about, the first cavity 124.

The light source 112 and the measurement detector 114 therefore reside in the first cavity 124 and the reference detector 116 resides in the third cavity 128. In this example, the light source 112 is disposed at a first side 131 of the first cavity 124 and the measurement detector 114 is disposed at another location about the first cavity 124. In this example, the measurement detector 114 is disposed about the first cavity 124 between the locations of the measurement detector 114 and a second side 133 of the first cavity 124 that is opposite the first side 131 thereof, such as between ends of a 90-degree arc extending between the light source 112 and the measurement detector 114 so as to facilitate multiple reflections of light therein before reaching the measurement detector 114 and thus achieving an extended period of interaction of the light with a target gas despite the limited size of the first cavity 124.

The second cavity 126 is located, in this example, adjacent the first cavity 124 and diametrically opposite the measurement detector 114. The second cavity 126 is optically transmissive and closed. In this example, the third cavity 128 is adjacent the second cavity 126 and outside the first cavity 124. The volume of the second cavity 126 is filled with the gas of interest to be tested or "target gas", for example carbon dioxide, which is hermetically sealed within the second cavity 126. A first internal wall 134 borders the first and second cavities 124, 126 and a second internal wall 136 borders the second and third cavities 126, 128. The first and second internal walls 134, 136 are at least in part light transmissive so that light emitted from the light source 112 can propagate through the first cavity 124, into the second cavity 126 and through to the third cavity 128. It can therefore be seen that the first and second internal walls 134, 136 comprise optically transmissive apertures that serve as windows. The second cavity 126 filled with the gas of interest serves as a filter for the light entering the second cavity 126.

In this example, the external peripheral wall 120 and/or an internal surface of the cap layer 118 is covered by a layer of reflective material 138, for example a metal. The layer of reflective material 138 serves to reflect light emitted by the light source 112, thereby decreasing the loss of the light to the external peripheral wall 120 of the first cavity 124 and increases the number of times the light passes through the gas to be measured in the first cavity 124. In some examples, another layer of reflective material (not shown) can be applied to the substrate layer 102, either solely in relation to the first cavity 124 or the entire surface of the substrate layer 102 to serve as an internal surface of the enclosure 101. In some examples, the layer of reflective material 138 can be roughened (as can be the case where a layer of reflective material is applied to the substrate layer 102) so as to tune and optimise the scattering of the light inside the enclosure 101, for example the first cavity 124. In another example, the surface(s) to which the layer of reflective material 138 is/are applied can be roughened prior to application of the layer of reflective material 138.

In operation, a gas under test, which is a predetermined gas of interest, is introduced to the first cavity 124 via the inlet port 130. The gas under test resides in the first cavity 124 until is exits the first cavity 124 via the outlet port 132. During the time when the gas is being tested, the light source 112 emits infrared light in the MIR range of the electromagnetic spectrum. Some of the infrared light emitted into the first cavity 124 is absorbed by any carbon dioxide molecules present in the gas under test, with the benefit of internal reflection caused by the layer of reflective material 138. In this regard, other wavelengths of some of the emitted light, and any infrared light not absorbed by the gas under test, which is incident upon the measurement detector 114 is translated to an electrical measurement signal. Similarly, the other wavelengths of some of the emitted light, and any infrared light not absorbed by the gas under test, passes through the second cavity 126 via the aperture in the internal wall separating the first cavity 124 from the second cavity 126 and MIR wavelengths of this light propagating through the second cavity 126 are at least partially absorbed by the carbon dioxide gas present in the second cavity 126, which serves as a gaseous filter. The remaining wavelengths of light continue propagating through the second cavity 126 into the third cavity 128 via the aperture in the internal wall separating the second cavity 126 from the third cavity 128. The light entering the third cavity 128 is incident upon the reference detector 116, where the light incident upon the reference detector 116 is translated into a reference electrical signal. The measurement and reference electrical signals are used as a differential signal to determine the quantity and/or concentration of carbon dioxide present in the gas under test.

Figure 4:
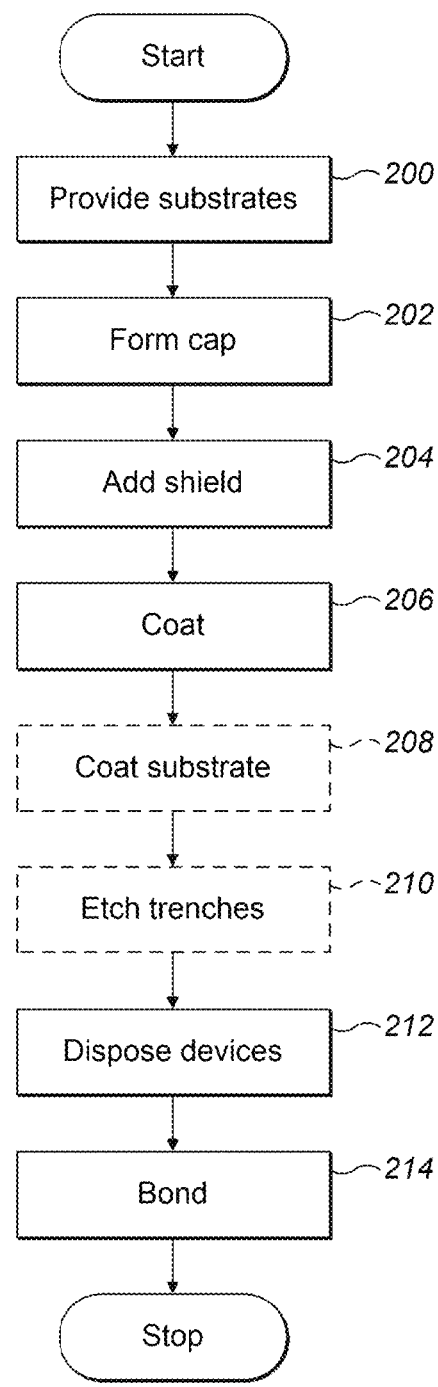
FIG. 4 is a flow diagram of a method of manufacturing the gas sensor device of FIG. 1 and constituting another embodiment of the invention.
Figure 5:
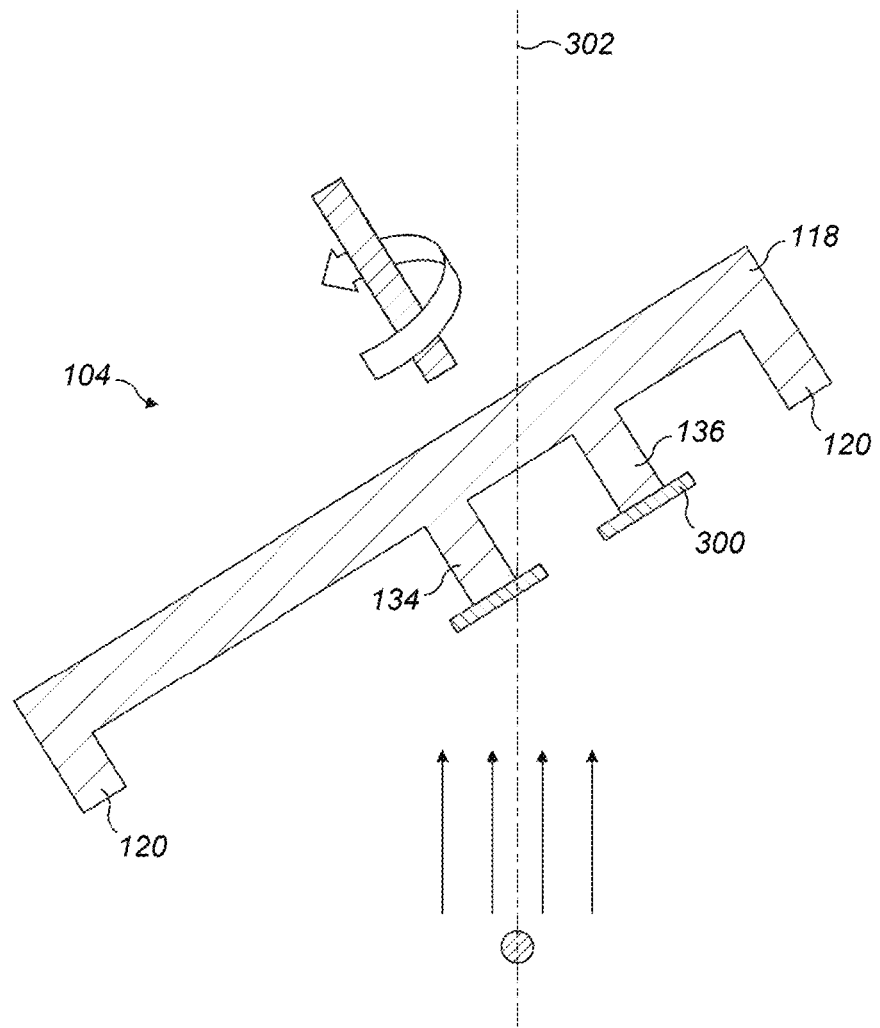
FIG. 5 is a schematic diagram of a cap of FIG. 1 during provision of optically transparent windows therein.

Referring to FIGS. 4 and 5, manufacture of the gas sensor device 100 can be as follows. A first blank silicon substrate and a second blank silicon substrate are grown (Step 200), using any suitable semiconductor growth technique. The first silicon substrate serves as the substrate layer 102 and the second silicon substrate is to be used for the cap layer 104. The cap layer 118 is then adapted (Step 202) using, for example, Deep Reactive Ion Etching (DRIE) to provide the cap 104 with the external peripheral wall 120, the first and second internal walls 134, 136, the inlet port 130, and the outlet port 132. The external peripheral wall 120 and the first and second internal walls 134, 136, serve to define the first, second and third cavities 124, 126, 128, when brought together with the substrate layer 102.

After etching (Step 202), shields 300 are placed over the ends of the first and second internal walls 134, 136 (Step 204), which can be for example pieces of photoresist dry film. Each shield extends substantially perpendicularly away from the first and second internal walls 134, 136, respectively, and serve to block the reflective material reaching the first and second internal walls 134, 136 during a subsequent deposition stage. In this respect, the cap 104 is oriented at a non-perpendicular angle relative to a longitudinal axis 302. The cap 104 is then rotated about the longitudinal axis 302, and a thin layer of the reflective material 138, for example gold, silver or copper, is applied (Step 206) in a direction that is parallel with the longitudinal axis 302, the shields 300 substantially preventing application of the reflective material to the first and second internal walls 134, 136, thereby leaving the first and second side walls 134, 136 optically transparent and thus provide the optically transmissive apertures mentioned above that serve as windows. In another example, the optically transmissive apertures can be defined by applying the photoresist by spray-coating to the sites on first and second walls 134 to comprise the windows. In such an example, the conformal coating of photoresist can comprise a modified solvent composition to facilitate application. Once the layer of reflective material 138 has been applied, the spray-coated regions of photoresist can be removed to complete formation of the windows. On the substrate layer 102, another thin layer of the reflective material is optionally deposited (Step 208). Likewise, trenches can optionally be etched (Step 210) into the substrate layer 102 by using Potassium Hydroxide (KOH), or DRIE, in order to define the first, second and third recesses 106, 108, 110 to receive, respectively, the light source 112, the measurement detector 114 and the reference detector 116. Then the light source 112, the measurement detector 114 and the reference detector 116 are integrated (Step 212) on the substrate layer 102 by means any suitable technique, for example flip-chip bonding or transfer printing. The light source 112, the measurement detector 114 and the reference detector 116 can be electrically connected to other circuitry by way of wire bonding or using vias, such as through-silicon vias. The substrate layer 102 and the cap 104 are then brought together and bonded (Step 214) together using, for example, wafer bonding.

In order to fill the second cavity 126 with the gas of interest, in this example carbon dioxide, the bonding can be performed using an atmosphere of the target gas. If elsewhere in the gas sensor device 100 hermetically sealed cavities are required without the presence of the target gas, a getter can be provided in the cavity where the target gas is not required, for example the third cavity 128, so as to remove the target gas.

Alternatively, hermetic sealing of the cavities where the target gas is unwanted can be avoided during the wafer bonding process by allowing the target gas to escape, for example by providing a small hole that can be later closed using any suitable filler. In this example, the activation temperature of the getter is above the temperatures used in the bonding process, and the getter is activated subsequent to the bonding process by exposing the cavity housing to the getter activation temperature. Alternatively, in the event that a getter with such an activation temperature cannot be used, the getter can be re-activated.

The skilled person should appreciate that the above-described implementations are merely examples of the various implementations that are conceivable within the scope of the appended claims. Indeed, it should be appreciated that although in this example shields are applied to the ends of the walls 120, 122 of the cap layer 118, where the substrate layer 102 is provided with the walls 120, 122 in an alternative example, the shields are applied to the ends of the walls 120, 122 of the substrate layer 102. Likewise, although the circuits to drive the light source 112, the measurement detector 114 and the reference detector 116 are described above as integrated onto the substrate layer 102, the skilled person will appreciate that circuits for one or more of these devices can be provided elsewhere, for example on a separate integrated circuit die wire bonded to one or more of the respective devices 112, 114, 116.

As mentioned above, it is possible to employ a thermal heater as a source of infrared electromagnetic radiation. In such examples, it can be desirable at least from an energy conservation perspective, to provide the thermal heater in a separate cavity to the first, second and third cavities 124, 126, 128. In this regard, the cap layer 118 can be formed with an additional wall so that when the cap layer 118 is brought into contact with the substrate layer 102 to form the gas sensor device 100 an additional cavity is provided for housing the thermal heater, the additional cavity being disposed adjacent the first cavity 124 and external to the other cavities 126, 128. Of course, in other examples as described above, the substrate layer 102 can comprise the additional wall instead of the cap layer 118. The additional cavity can be formed, for example, so as to house the thermal heater in a vacuum so as to avoid convective cooling. The additional wall can be configured to comprise another window to permit the electromagnetic radiation emitted, when in use, by the thermal heater to propagate into the first cavity 124. The thermal heater can comprise a resistor formed on a membrane, for example, the resistor being employed to heat the membrane. In other examples, the membrane can optionally comprise one or more thermopiles, for example where the temperature of the membrane needs to be monitored.

It should be appreciated that references herein to "infrared", other than where expressly stated otherwise, are intended as references to electromagnetic energy having wavelengths in the range of 700 nm to 1 mm, such as 760 nm to 1 mm or 700 nm to 1500 nm, which includes electromagnetic radiation in the near infrared region, the middle infrared region and the far infrared region.

What is claimed is:

1. A gas sensor device configured to measure a predetermined gas of interest, the device comprising:
   an enclosure comprising a semiconductor substrate and defining a first cavity, an optically transmissive second closed cavity and a third cavity, the second cavity being interposed between the first and third cavities; wherein
   the first cavity comprises an inlet port for receiving a gas under test, an outlet port for venting the gas under test, an optical source and a measurement sensor;
   the second cavity is configured as a gaseous filter comprising a volume of the gas of interest sealingly disposed in the second cavity; and
   the third cavity comprises a reference measurement sensor disposed therein.

2. The device according to claim 1, wherein the second cavity comprises optically transmissive apertures bordering the first and third cavities.

3. The device according to claim 1, wherein the first cavity is substantially cylindrical.

4. The device according to claim 1, wherein the second cavity is disposed adjacent the first cavity.

5. The device according to claim 1, wherein the third cavity is disposed adjacent the second cavity and outside the first cavity.

6. The device according to claim 1, wherein the enclosure further comprises a cap configured to cooperate with the substrate to define the first, second and third cavities.

7. The device according to claim 6, further comprising:
   walls extending away from the cap; wherein
   the walls cooperate with the substrate to define the first, second and third cavities.

8. The device according to claim 7, wherein the walls are integrally formed with the cap.

9. The device according to claim 6, further comprising:
   walls extending away from the substrate; wherein
   the walls cooperate with the cap to define the first, second and third cavities.

10. The device according to claim 1, wherein the enclosure comprises reflective internal surfaces.

11. The device according to claim 1, wherein the substrate comprises a first trench and a second trench in respect of the first cavity, the optical source being disposed in the first trench and the measurement sensor being disposed in the second trench.

12. The device according to claim 1, wherein the third cavity comprises a getter.

13. The device according to claim 1, wherein the reference measurement sensor is sealingly disposed within the third cavity.

14. The device according to claim 1, wherein the semiconductor substrate is reflective.

15. A method of manufacturing a gas sensor device, the method comprising:
   providing a substrate comprising a first area, a second area and a third area;
   providing a cap;
   providing an optical source and a measurement sensor within the first area of the substrate;
   providing a reference sensor within the third area of the substrate;
   configuring the cap; and
   affixing the cap to the substrate, the substrate and cap cooperating to define a first cavity bounding the first area, a second cavity bounding the second area and a third cavity bounding the third area; and
   providing a volume of a gas of interest in the second cavity; wherein
   the cap cooperates with the substrate so that the first cavity comprises an inlet for receiving a gas under test and an outlet port for venting the gas under test.

16. The method according to claim 15, wherein
   the cap comprises internal walls; and the method further comprises:
   affixing shields respectively to exposed ends of the internal walls;
   orienting the cap at a non-perpendicular angle relative to a longitudinal axis;
   rotating the cap about the longitudinal axis; and
   applying a layer of reflective material in a direction that is parallel with the longitudinal axis, the shields substantially preventing application of the reflective material to the internal walls.

17. The method according to claim 15, further comprising:
   affixing the cap to the substrate in an atmosphere of the gas of interest.

* * * * *